Patented Mar. 1, 1938

2,110,073

UNITED STATES PATENT OFFICE 2,110,073

COATING COMPOSITION

Alfonso M. Alvarado, Wilmington, Del., and Richard T. Ubben, Lakewood, Ohio, assignors to E. I. du Pont de Nemours & Company, Wilmington, Del., a corporation of Delaware No Drawing. Application November 5, 1935, Serial No. 48,440

1 Claim. (Cl. 134—26)

This invention relates to resinous materials, and more particularly to improved resins derived from the aldehyde-phenol type and to coating compositions containing them.

In conventional varnish-making procedure, a natural acidic resin or ester thereof, usually rosin or ester gum, is heated with one or more drying oils until a homogeneous blend of the proper body is obtained, the mixture then being thinned with a solvent such as turpentine or mineral spirits. It has long been an object of the varnish art to substitute a synthetic resin for the rosin. The aldehyde-phenol resins, because of their great commercial importance, and because of their durability, inertness, and high gloss, have received most attention for this purpose. A number of methods have been proposed for their use in oil-type coating compositions, among them being the well known treatment of the aldehyde-phenol resins with rosin or ester gum to render them more oil-soluble or oil-dispersible. The resulting products, known in the trade as "Amberols", "Albertols", etc. are very useful as ingredients of oil-type coating compositions such as varnishes, enamels, etc., but are open to two objections; namely, (1) their phenol-formaldehyde resin content cannot exceed about 15-25% because of insufficient solubility in oils and (2) dry films of the coating compositions containing them are prone to discoloration on exposure to sunlight or to other weathering conditions. This discoloration is usually referred to as "after-yellowing". Amberol type resins have also been made by blending ordinary phenol-formaldehyde resins with hydrogenated polyhydric alcohol esters of acidic gums (e. g., hydrogenated ester gum). These resins have better compatibility with oils, etc. than do ordinary ester-gum modified Amberol resins, but are not completely satisfactory as varnish ingredients.

An object of this invention is the preparation of new and improved synthetic resins which are useful as coating compositions. A further object is the preparation of improved coating compositions which are useful as varnish vehicles or ingredients thereof. Further objects will appear hereinafter.

These objects are accomplished by heating together, in the manner described hereinafter, hydrogenated aldehyde-phenol resins, natural acidic resin, and polyhydric alcohol, and blending the products with drying oils, cellulose derivatives, etc.

We have discovered that by first hydrogenating the aldehyde-phenol resin and then blending by means of suitable heat treatment the hydrogenated resin with natural acidic resin and polyhydric alcohol new and highly useful compositions are obtained. These resinous compositions are much less prone to discoloration (after-yellowing) upon exposure to weather conditions than are ordinary rosin or ester-gum modified aldehyde-phenol resins. In addition, the varnishes prepared from the new resins have the surprising property of drying faster than the varnishes prepared from the Amberol type resins.

The hydrogenated aldehyde-phenol resins employed herein may be prepared as described in co-pending applications of R. T. Ubben, Serial Numbers 727,283 and 727,284, filed May 24, 1934 now Patent Nos. 2,072,142 and 2,072,143. A suitable method is, for example, as follows: The unhydrogenated resin is dissolved in a suitable organic solvent, such as ethyl alcohol, and a hydrogenation catalyst, e. g. nickel supported on kieselguhr, added. The mixture is placed in an autoclave equipped with agitating means and subjected to contact with hydrogen, under suitable temperature and pressure conditions, until the desired degree of hydrogenation is accomplished. The temperatures are preferably within the range of 140 to 225° C. and the pressures within the range of 140 to 4000 pounds per square inch. The catalyst is removed by filtration and the resin recovered by evaporation of solvent. The extent of hydrogenation effected in each case will depend upon the degree to which it is desired to modify the properties of the original resin, any substantial addition of hydrogen being effective in producing to some extent the improvement in properties hereinbefore referred to.

In the preferred practice of our invention, we heat together at about 235° C. the desired proportions of rosin, hydrogenated formaldehyde-phenol resin, and glycerol in the presence of a trace of magnesium oxide (blowing the mixture with carbon dioxide or other inert gas during the reaction) until the desired acid number is obtained. An acid number of from 10 to 30 is satisfactory. Blowing of the reaction mixture with an inert gas reduces the time required for reaction, removes volatile reaction products such as water, and produces lighter-colored resins.

The reaction products are particularly useful as varnish ingredients, and varnishes can be made from them according to the usual varnish procedure which is well known to those skilled in the art.

The following examples are submitted to illustrate the practice of this invention and not to limit it:

*Example I*

A mixture of rosin 100 parts, glycerol 12.5 parts, hydrogenated formaldehyde-cresol resin 35 parts, and magnesium oxide 0.5 part, was charged into a vessel fitted with stirrer and thermometer, and heated one hour up to 235° C. and five hours at 235° C., or until an acid number between 25 and 30 was reached. During this time carbon dioxide was blown through the reaction mixture. The final product was a hard, brittle resin which readily dissolved in China-wood oil. This was made into a 25-gallon China-wood oil varnish as follows:

To 12.5 parts of the resin as prepared above, 24.3 parts of China-wood oil was added. This mixture was heated 15 minutes up to 225° C. and held at 225–230° C. for 15 minutes. An equal weight of "Hi-flash naphtha" was added, and cobalt drier as cobalt linoleate introduced in an amount sufficient to give a concentration of 0.02% cobalt, based on the oil. This varnish had a viscosity of 0.5 poise and dried tack-free in 4–5 hours. It also had definitely less tendency to after-yellowing than a varnish made from a similar resin prepared from unhydrogenated formaldehyde-cresol resin or from commercial Amberols. After eight months' exposure outdoors this varnish was still in excellent condition, the film showing no failure at any point.

A 25-gallon varnish made from formaldehyde-cresol resin requires about fifteen hours to dry tack-free, and has definitely more tendency to after-yellowing than the varnish containing the resin prepared as described above from hydrogenated formaldehyde-cresol resin.

*Example II*

A mixture of crude rosin 100 parts, glycerol 12.5 parts, a hydrogenated formaldehyde-xylenol resin 35 parts, and magnesium oxide 0.5 part, was heated up to 250° C. in 30 minutes and held at 250° for 4.25 hours while blowing with carbon dioxide. The final resin was hard, brittle, and had an acid number of 10, and was soluble in aromatic or aliphatic hydrocarbons, etc. The resin was compatible with cellulose nitrate, ethyl cellulose and paraffin wax. A 25-gallon China-wood oil varnish made from this resin had a viscosity of 0.5 poise and dried tack-free in six hours. The varnish had less tendency to after-yellowing than varnishes prepared from corresponding unhydrogenated resins. The varnish prepared in accordance with the present example also shows very good durability on outdoor exposure.

*Example III*

A mixture of crude rosin 85 parts, glycerol 10 parts, hydrogenated formaldehyde-phenol resin 15 parts, and magnesium oxide 0.5 part, was heated at 250° C. while blowing with carbon dioxide for 4–5 hours, or until an acid number of 27 was obtained. The resulting hard, brittle resin was soluble in toluene, butyl acetate, China-wood oil, etc. A 12.5-gallon varnish made from it was clear and dried in four hours to a hard clear film. The varnish had definitely less tendency to after-yellowing than ordinary Amberol type varnishes.

An alternative procedure from that given in the foregoing examples consists in first reacting the natural resin and glycerine, then adding the hydrogenated aldehyde-phenol resin, and heating the mixture.

Hydrogenated aldehyde-phenol resins from all phenols known to be useful in the manufacture of aldehyde-phenol resins may be used in the practice of our invention. Examples of such phenols are as follows: o-cresol, p-cresol, xylenols, thymol, mesitol, carvacrol, o-ethyl phenol, p-tertiary butyl phenol, p-tertiary amyl phenol, bis(4-hydroxyphenyl)dimethyl methane, bis(3-methyl-4-hydroxyphenyl)-dimethyl methane, resorcinol, p-phenyl phenol, etc. The resins may be made from various known equivalents of aqueous formaldehyde, such as p-formaldehyde, methylene chloride, hexamethylene tetramine, etc. Other aldehydes, such as acetaldehyde and benzaldehyde, may replace the formaldehyde.

The glycerol mentioned in the examples may be replaced with other polyhydric alcohols such as dithylene glycol, sorbitol, pentaerythritol, hexamethylene glycol, etc. The glycol resins are not as high melting and as hard as those prepared with glycerol.

Various natural acidic resins may be used instead of rosin. Such resins include run Congo, kauri, Manila, elemi, sandarac, Zanzibar. If desired the natural resin may be hydrogenated before its use as a reacting ingredient in accordance with known methods. The rosin may also be partly replaced by rosin-maleic anhydride addition products which are well known in the literature. Similar well known addition compounds of maleic anhydride with various terpenes may also be used to replace part of the rosin.

As a catalyst for speeding up the reaction we may use, instead of magnesium oxide, the oxides of the alkaline earth metals generally, others being calcium and barium oxides. The reaction temperatures are as a rule greater than 200° C. and less than 300° C.

The new resins disclosed herein may be used as the basis of industrial finishes which are widely used, e. g. in quick drying enamels, varnishes, lacquers, etc. They are, moreover, useful for any of the purposes for which ordinary Amberol type resins can be employed. Our resins are useful per se or combined with one or more of the following: Other natural or synthetic resins, such as polyhydric alcohol-polycarboxylic acid esters, other phenol-aldehyde resins (either hydrogenated or unhydrogenated), cumar, rosin esters, chlorinated rubber, etc. Pigments, fillers, softeners or plasticizers, solvents, etc., can also be added to our resins or to compositions containing them.

Our new resins possess decided advantages over the rosin aldehyde-phenol resins hitherto prepared. For example, we can use larger proportions of hydrogenated formaldehyde-phenol resins in our reaction mixtures than it has heretofore been possible to use in the case of unhydrogenated phenol-formaldehyde resins. The resulting resins and varnishes, etc., prepared from them thus have the desirable characteristics of the phenol-formaldehyde-type resins less obscured by rosin or rosin glycerides than do ordinary Amberol type resins or varnishes prepared from them. Our resins and varnishes prepared from them also have definitely less tendency to after-yellowing than ordinary Amberol type resins and varnishes. They are also faster drying and have equally good durability. The present resins are also relatively inexpensive to manufacture since they are prepared from readily available cheap materials.

As many apparently widely different embodiments of this invention may be made without departing from the spirit and scope thereof, it is to be understood that we do not limit ourselves to the specific embodiments thereof except as defined in the appended claim.

We claim:

A rapidly drying varnish containing a drying fatty oil, varnish solvent, and the resin obtained by heating together rosin, glycerol and a formaldehyde-phenol resin that has been hydrogenated in the presence of a hydrogenating catalyst at a temperature of 140–225° C. and a pressure of 140 to 2000 pounds per square inch, said varnish having less tendency to after-yellowing and drying at least twice as fast as the analogous varnish based on the corresponding unhydrogenated formaldehyde-phenol resin.

ALFONSO M. ALVARADO.
RICHARD T. UBBEN.

CERTIFICATE OF CORRECTION.

Patent No. 2,110,073.                                           March 1, 1938.

ALFONSO M. ALVARADO, ET AL.

It is hereby certified that error appears in the printed specification of the above numbered patent requiring correction as follows: Page 2, second column, line 8, after "follows:" insert the word and comma phenol,; and line 21, for "dithylene" read diethylene; and that the said Letters Patent should be read with these corrections therein that the same may conform to the record of the case in the Patent Office.

Signed and sealed this 14th day of June, A. D. 1938.

(Seal)

Henry Van Arsdale,
Acting Commissioner of Patents.

manufacture since they are prepared from readily available cheap materials.

As many apparently widely different embodiments of this invention may be made without departing from the spirit and scope thereof, it is to be understood that we do not limit ourselves to the specific embodiments thereof except as defined in the appended claim.

We claim:

A rapidly drying varnish containing a drying fatty oil, varnish solvent, and the resin obtained by heating together rosin, glycerol and a formaldehyde-phenol resin that has been hydrogenated in the presence of a hydrogenating catalyst at a temperature of 140–225° C. and a pressure of 140 to 2000 pounds per square inch, said varnish having less tendency to after-yellowing and drying at least twice as fast as the analogous varnish based on the corresponding unhydrogenated formaldehyde-phenol resin.

ALFONSO M. ALVARADO.
RICHARD T. UBBEN.

CERTIFICATE OF CORRECTION.

Patent No. 2,110,073.  March 1, 1938.

ALFONSO M. ALVARADO, ET AL.

It is hereby certified that error appears in the printed specification of the above numbered patent requiring correction as follows: Page 2, second column, line 8, after "follows:" insert the word and comma phenol,; and line 21, for "dithylene" read diethylene; and that the said Letters Patent should be read with these corrections therein that the same may conform to the record of the case in the Patent Office.

Signed and sealed this 14th day of June, A. D. 1938.

(Seal)

Henry Van Arsdale,
Acting Commissioner of Patents.

CERTIFICATE OF CORRECTION.

Patent No. 2,110,073. March 1, 1938.

ALFONSO M. ALVARADO, ET AL.

It is hereby certified that error appears in the printed specification of the above numbered patent requiring correction as follows: Page 2, second column, line 8, after "follows:" insert the word and comma phenol,; and line 21, for "dithylene" read diethylene; and that the said Letters Patent should be read with these corrections therein that the same may conform to the record of the case in the Patent Office.

Signed and sealed this 14th day of June, A. D. 1938.

(Seal)

Henry Van Arsdale,
Acting Commissioner of Patents.